United States Patent [19]

Hayakawa et al.

[11] 4,400,844
[45] Aug. 30, 1983

[54] WIPER DEVICE

[75] Inventors: Nobuo Hayakawa, Higashimurayama; Yasuo Ohashi; Kenji Ohta, both of Yokohama; Yasumasa Takagi, Higashimatsuyama; Masami Gotoh, Machida, all of Japan

[73] Assignees: Nissan Motor Co., Ltd.; Jidosha Denki Kogyo Kabushiki Kaisha, both of Yokohama, Japan

[21] Appl. No.: 338,599

[22] Filed: Jan. 11, 1982

[30] Foreign Application Priority Data

Jan. 14, 1981 [JP] Japan .................................. 56-4757

[51] Int. Cl.³ .......................... B60S 1/22; F16H 21/40
[52] U.S. Cl. .................................... 15/250.16; 74/70; 74/75
[58] Field of Search .......... 15/250.15, 250.16, 250.17, 15/250.19; 74/52, 70, 75, 600

[56] References Cited

U.S. PATENT DOCUMENTS

| 2,733,609 | 2/1956 | Latta | 15/250.17 X |
| 2,753,721 | 7/1956 | Latta | 74/75 |
| 2,810,294 | 10/1957 | Latta et al. | 74/70 X |
| 3,665,772 | 5/1972 | Beard et al. | 74/75 |

FOREIGN PATENT DOCUMENTS 5147 11/1979 European Pat. Off. ......... 15/250.16

Primary Examiner—Peter Feldman
Attorney, Agent, or Firm—Schwartz, Jeffery, Schwaab, Mack, Blumenthal & Koch

[57] ABSTRACT

A wiper device equipped with a rise up mechanism, including a motor, a blade, a wiper pivot, a motor arm which rotates in one direction during the starting and wiping operations of the blade and which rotates in a reverse direction during the parking and stopping operations of the blade, a connecting rod reciprocating in response to the rotation of the motor arm to swing the wiper pivot, a retainer for retaining the connecting rod, an eccentric member for rotating together with or relative to the retainer, a friction spring disposed between the eccentric member and the retainer for permitting the rotation of the eccentric member relative to the retainer only just after the starting of the blade or just before the parking and stopping of the blade, and a cam mechanism for rotating the eccentric member together with the retainer during all operations except the operation during which the eccentric member rotates relative to the retainer just after the starting of the blade or just before the parking and stopping thereof so as to change the effective length of the connecting rod to the eccentric degree of the eccentric member.

10 Claims, 22 Drawing Figures

FIG.8a
FIG.8b
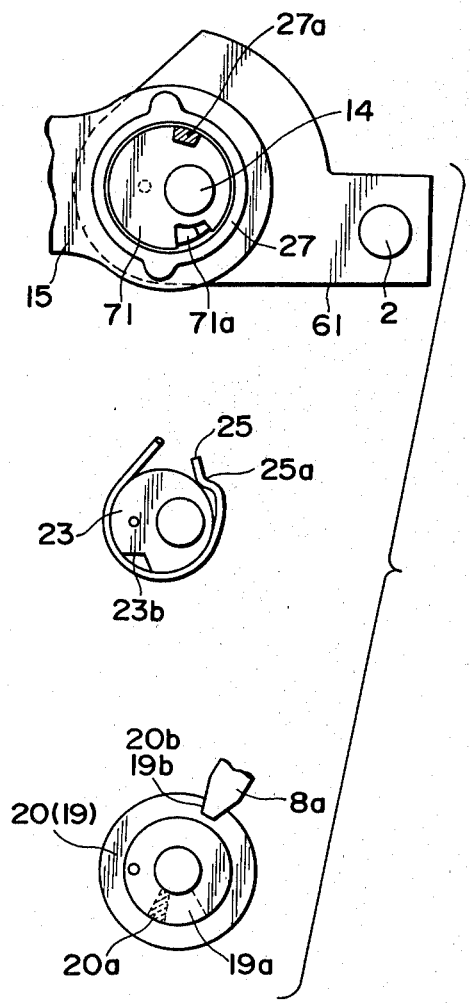
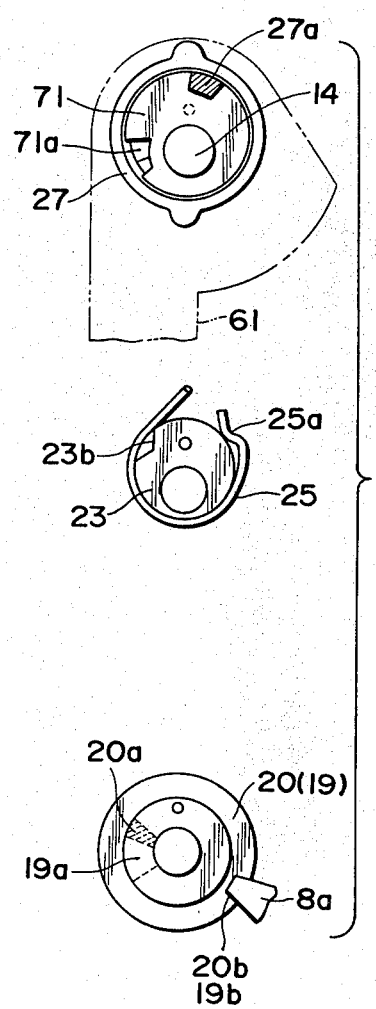

WIPER DEVICE

BACKGROUND OF THE INVENTION

This invention relates to a wiper device equipped with a rise-up mechanism.

In general, a rise-up mechanism is a mechanism for shifting a wiper blade to a position away from its normal wiping positions when it stops so that a driver does not see the blade in front of his eyes.

FIGS. 1a to 1c show schematically a sequence of wiping operational steps. During the starting step, the blade 18 shifts from a parked position A through the position B to the position C. Thereafter, the blade 18 reciprocates between the positions B and C during its normal wiping operation. At the stopping step, the blade 18 shifts from the position B to the position C and then again from the position C through the position B to the parked position A in which it stops.

FIGS. 2 to 4 show a conventional rise-up mechanism for a wiper device in which the effective length of a connecting rod or link is changed by reverse rotation of a motor when a wiper switch is switched off.

A cover plate 3, latch spring 4, latch 5, motor arm 6 and eccentric member 7 are assembled in order onto a motor shaft 2 of a motor 1 and fixed thereto by means of a screw 10. The cover plate 3 is attached through a grommet 11 to the motor body. The eccentric member 7 is biased into the central axial hole of the motor arm 6 by means of a spring 12. In one end thereof, a stopper 8 is attached to engage the groove 7a of the eccentric member 7 and a spring 13 is attached to bias the stopper. At the other end thereof, a joining shaft 14 is provided to be joined to a connecting rod 15 is provided. A groove 6a is formed in the lower surface of the motor arm 6 near the joint shaft 14 and engages a pawl 5a of the latch 5. A pawl 7b projects from the lower surface of the eccentric member 7 and presses the inner actuating portion 5b of the latch 5 to slide the latch 5 so that the pawl 5a becomes disengaged from the groove 6a.

In operation, first, the motor 1 rotates to the right during starting. When the motor shaft 2 starts to rotate to the right, the pawl 5a of the latch 5, which is prevented from rotating by the cover plate 3, engages the groove 6a of the motor arm 6 as shown in FIG. 4, so that the motor 1 does not rotate while the motor shaft 2 and the eccentric member 7 rotate together as shown in FIG. 4b. When they rotate by 180°, as shown in FIG. 4c, the stopper 8 engages the groove 7a of the eccentric member 7 by the biasing force of the spring 13. At the same time, the pawl 7b of the eccentric metal 7 presses the inner actuating portion 5b of the latch 5 to slidably shift the latch 5 to the left as shown in FIG. 4c. As a result, the pawl 5a of the latch 5 leaves the groove 6a of the motor arm 6.

Assuming that the length or distance between the center of the joint shaft 14 and the center of the eccentric member 7 is R and that the length (eccentric degree) between the center of the eccentric member 7 and the rotation center thereof is r, the effective length between the centers of the motor shaft 2 and the joint shaft 14 of the motor arm 6 changes from (R+r) to (R−r) due to the eccentric effect when the eccentric member 7 rotates by 180°.

From the condition of FIG. 4c, the motor arm 6 rotates as shown in FIGS. 4d to 4f in response to the rotation of the motor shaft 2 together with the eccentric member 7 resulting from engaging stopper 8 with the groove 7a. The motor arm 6 further rotates and returns from the condition of FIG. 4f to the condition of FIG. 4c. While the motor arm 6 rotates as shown in FIGS. 4c to 4f, the connecting rod 15 joined to the joint shaft 14 reciprocates to swing the wiper pivot 16 around the axis 17 so that the blade 18 reciprocates in its normal wiping range between the positions B and C in FIG. 1b.

When a wiper switch (not shown) is switched off to stop the motor shaft 2, it continues to rotate until the condition of FIG. 4c where the motor shaft 2 begins to rotate in a reverse direction. After such reverse rotation of the motor shaft 2 in the condition of FIG. 4c, the groove 6a of the motor arm 6 contacts the pawl 5a of the latch 5. (It does not contact the pawl 5a in case of the right rotation thereof). As shown in FIG. 4g, the groove 7a of the eccentric member 7 pushes the stopper 8 at its tapered surface during its reverse rotation against the biasing force of the spring 13 so that the stopper 8 is disengaged therefrom. Thus, as shown in FIG. 4g, the motor arm 6 does not rotate and only the eccentric member 7 rotates so that after its 180° rotation the pawl 5a engages the groove 6a as shown in FIG. 4a. Also, the length or distance between the center of the joint shaft 14 of the motor arm 6 and the motor shaft 4 changes from (R−r) to (R+r) due to the eccentric effect of the eccentric member 7 by its 180° rotation. The effective length of the connecting rod 15 changes so that the blade 18 can be received in the position A of FIG. 1.

In the above-stated conventional wiper device, however, the latch 5 slides during the rise-up operational step. The rise-up operation cannot be accomplished by rotation of the members only. For this reason, the operation is not sure and stable. In addition, as the rotating members have some sliding portions, the mechanism is apt to be complicated. Thus, assembling thereof is difficult and its production cost is high.

On the other hand, during the starting step, the blade 18 starts to operate only after the motor shaft 2 freely rotates by 180°. Therefore, the response of the device is poor.

Although not shown, in another conventional rise up mechanism for a wiper device, a motor itself moves to shift a motor shaft. In such a device, a mechanism for shifting the motor is complex in construction. As compared with a general wiper device, a rise up mechanism is expensive.

OBJECT OF THE INVENTION

The object of the invention is to provide a wiper device equipped with a rise-up mechanism wherein its construction is simple and assembling thereof is easy with low costs and wherein its operation is stable and sure with quick responsibility.

BRIEF DESCRIPTION OF THE DRAWINGS

FIGS. 8a to 8e show a sequence of operational steps of the wiper device shown in FIG. 5.

DETAILED DESCRIPTION OF THE PREFERRED EMBODIMENT

Figure 6:
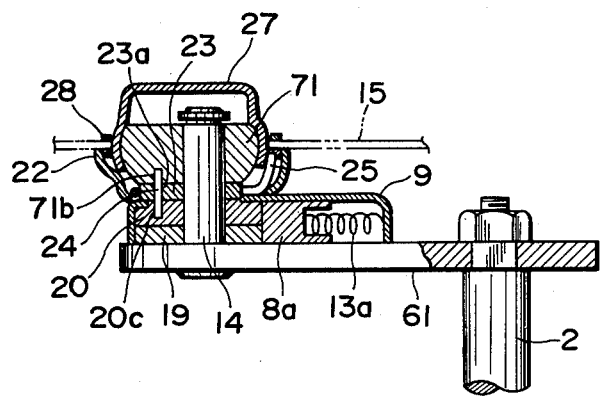
FIG. 6 is a sectional view showing an essential portion of the wiper device shown in FIG. 5.

Referring to FIGS. 5 through 8, a motor arm 61 is fixed at its one end to a motor shaft 2 which is joined to the motor 1 as in the above-stated prior art device. A connecting rod or shaft 14 is fixed to or near the other end of the motor arm 61. A first cam 19 has a projection-receiving groove 19a at the upper portion thereof, a stopper-engaging groove 19b at the peripheral portion thereof, and a small diameter boss 19c at the upper portion thereof. A second cam 20 has a projection 20a received in the projection-receiving groove 19a of the first cam 19 at the lower portion thereof, a pin hole 20c at the upper portion thereof and a stopper-engaging groove 20b at the periphery thereof. The first and second cams 19, 20 are fixed at the shaft holes thereof to the connecting shaft 14, one over the other, such that the projection 20a is movably received in the groove 19a. A stopper 8a is pressed or biased against the periphery of the first and second cams 19 and 20 by means of a spring 13a. A holder 9 holds therein the first and second cams 19, 20, the stopper 8a and the spring 13a as best shown in FIG. 6. The connecting shaft 14 is inserted into the hole of the holder 9 while the holder 9 is fixed onto the motor arm 61 by means of screws 21. The connecting shaft 14 is further inserted into the hole of a joint seal 22 and the hole of an eccentric plate 23 so that they are assembled in position as shown in FIG. 6.

A pin 24 is inserted through the shaft hole of the holder 9 and a pin hole 23a of the eccentric plate 23 into a pin hole 71b of an eccentric member 71 and a pin hole 20c of the second cam 20 so that the eccentric member 71, the eccentric plate 23 and the second cam 20 are fixedly assembled together. A friction spring 25 is disposed between the periphery of the eccentric plate 23 and the inner surface of a retainer 27 in such a manner that the retainer 27 can rotate relative to the eccentric member 71 only just after a blade starts to move or just before it stops to return.

The eccentric member 71 has a projection 71a on its upper surface and is fixed to the connecting shaft 14. A stop ring 26 is attached to the connecting shaft 14 so that the assembled parts can be prevented from loosing. The retainer 27 can rotate together with or relative to the eccentric member 71 and has a projection 27a.

A connecting rod 15 is connected at its one end to the wiper pivot 16, blade 18 and others as in the abovestated prior art device and at its other end partially retained within the retainer 27 by means of a retainer ring 28 to reciprocate in response to right and reverse rotations of the motor arm 61 thereby to swing the wiper pivot 16.

The eccentric member 71 and the eccentric plate 23 may be formed as one body.

Figure 1A:
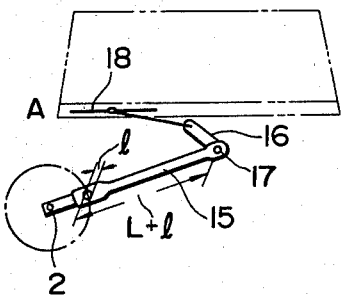
FIGS. 1a to 1c shows schematically a sequence of operations of a general wiper device equipped with a rise up mechanism.
Figure 1B:
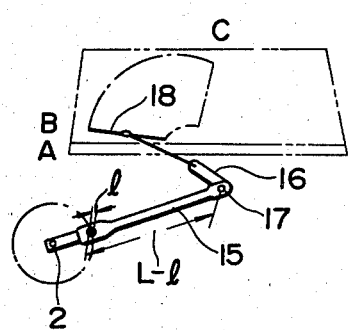
Figure 1C:
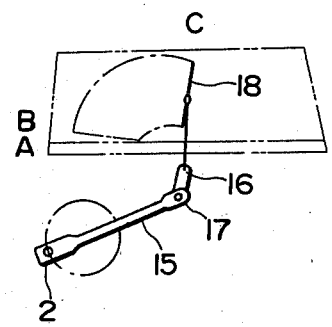
Figure 2:
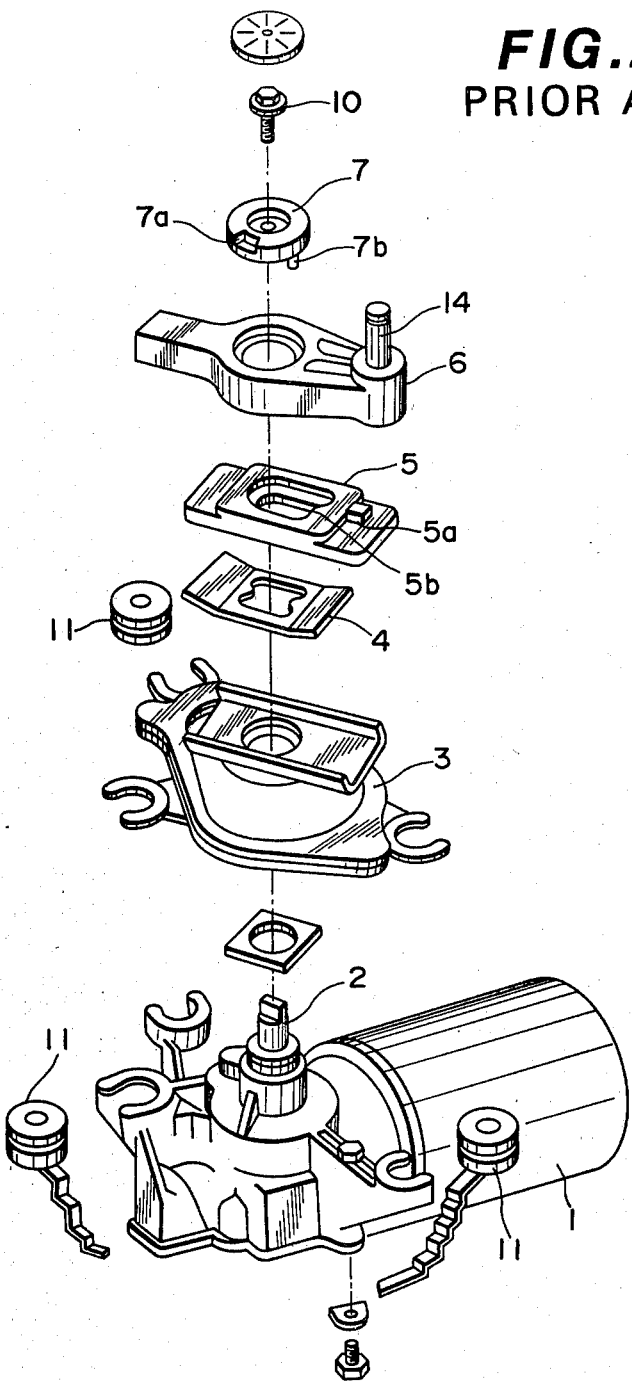
FIG. 2 is a partially exploded view showing a prior art wiper device.
Figure 3:
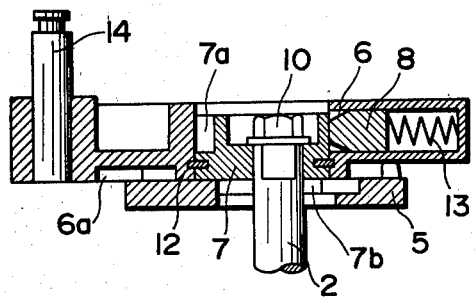
FIG. 3 is a sectional view showing an essential portion of the prior art wiper device shown in FIG. 2.
Figure 4A:
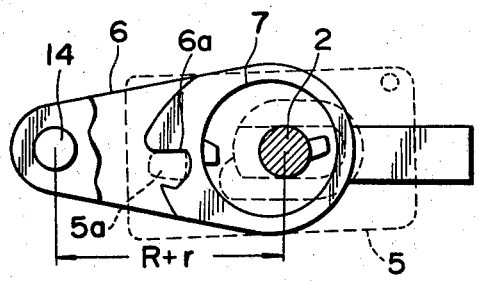
FIGS. 4a to 4g show a sequence of operational steps of the prior art wiper device shown in FIG. 2.
Figure 4B:
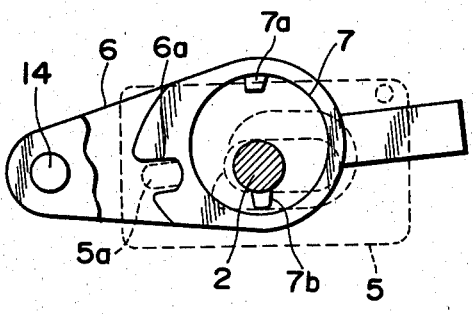
Figure 4C:
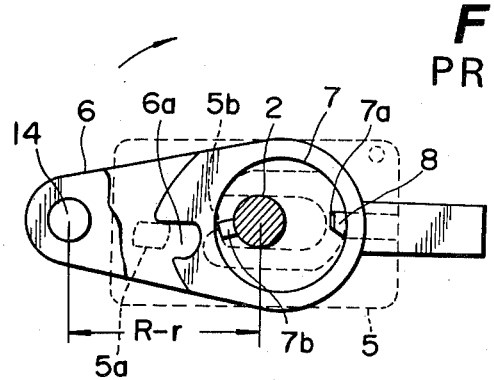
Figure 4D:
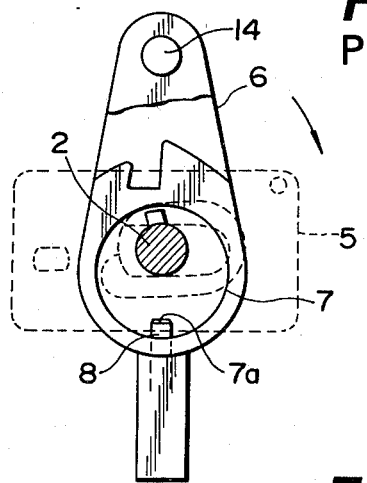
Figure 4E:
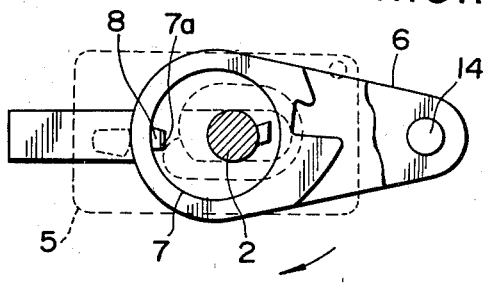
Figure 4F:
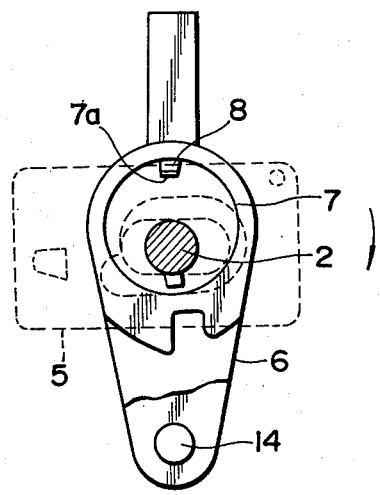
Figure 4G:
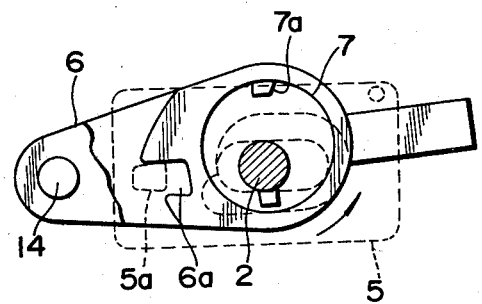
Figure 5:
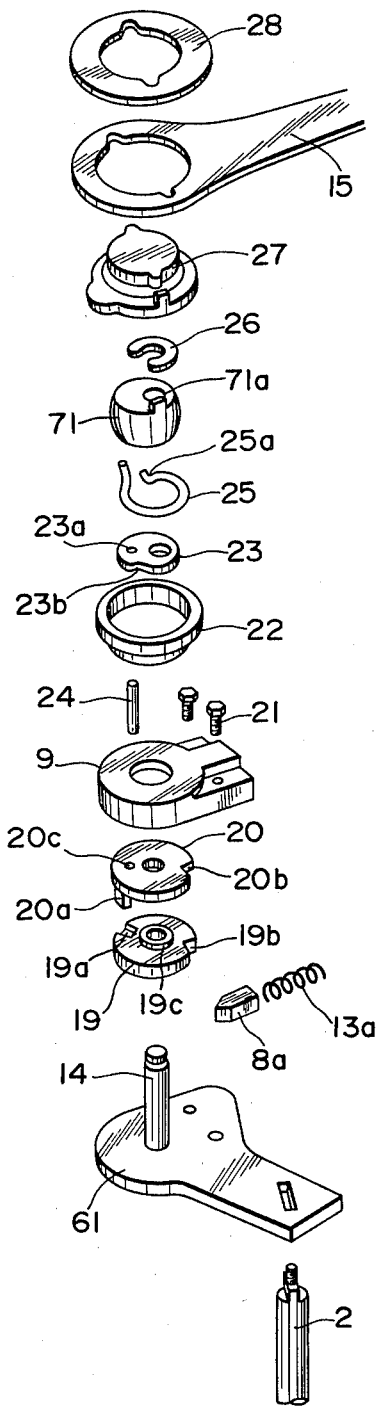
FIG. 5 is a partially exploded view showing an embodiment of a wiper device equipped with a rise up mechanism according to the present invention.

When the blade 18 wipes as shown in FIGS. 1b and 1c the effective length of the connecting rod 15 is shorter than the actual length thereof which is the length between both connecting points at both ends of the connecting rod 15, by the eccentric degree or length l of the eccentric member 71. Thus, the effective length of the connecting rod 15 is (L−l).

Figures 8C, 8D, 8E:
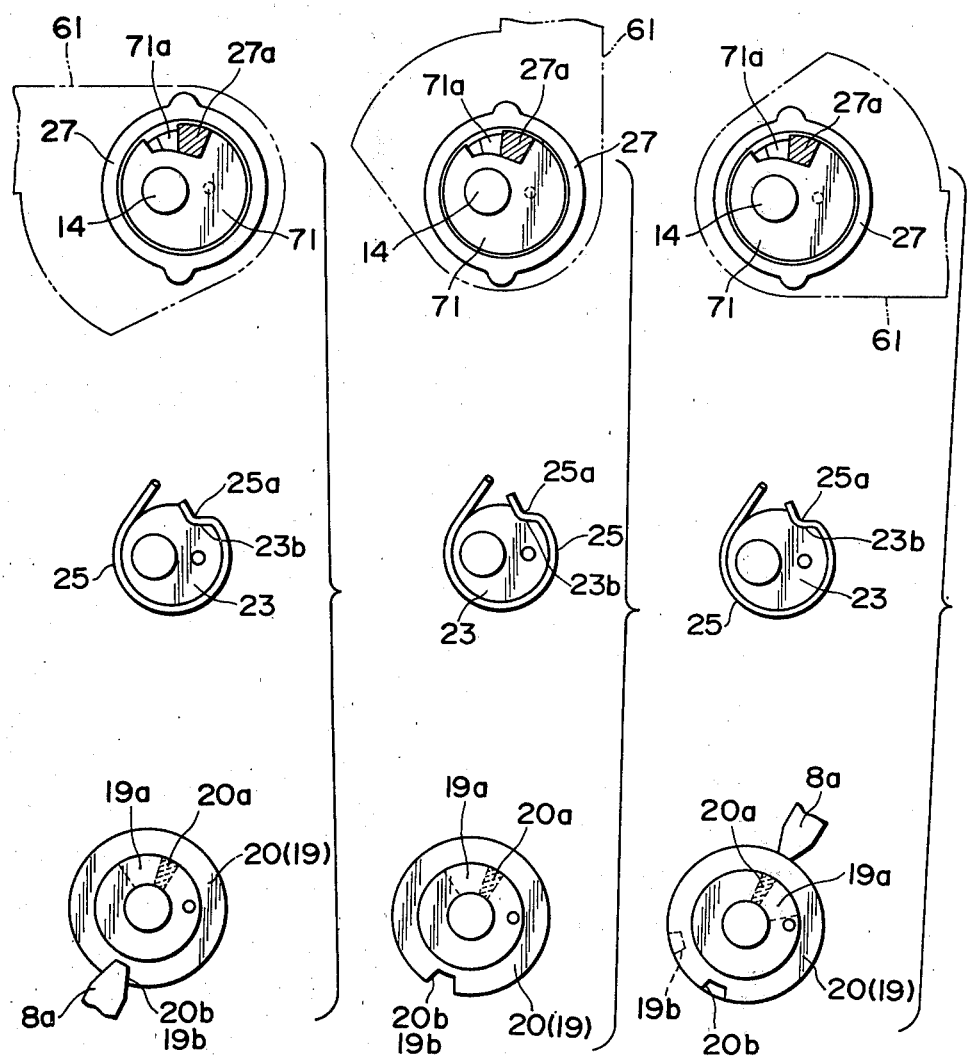

As shown in FIG. 8e, the projection 71a of the eccentric member 71 contacts the projection 27a of the retainer 27 so that they can rotate together in response to the rotation of the motor arm 61 actuated by the motor shaft 2. Thus, when the motor arm 61 rotates, the connecting rod 15 reciprocates whereby the blade 18 swings within the wiping range between the positions B and C shown in FIG. 1b during its wiping operation.

Figure 7A:
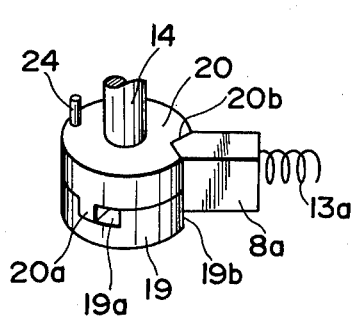
FIGS. 7a and 7b are perspective views showing a sequence of operations of a cam mechanism used in the wiper device of the present invention.
Figure 7B:
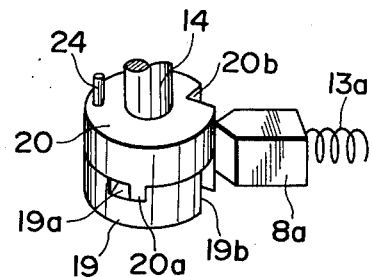

During such wiping operation, the groove 23b of the eccentric plate 23 engages the projection 25a of the friction spring 25 while one side of the groove 19a of the cam 19 contacts the projection 20a of the cam 20 so that the groove 19b of the cam 19 does not mate with, i.e. is separated from, the groove 20b of the cam 20 as shown in FIGS. 7b and 8e, and the stopper 8a lifts from the grooves 19b and 20b and engages the periphery of the cams 19, 20. Thus, the cams 19, 20 are not stopped by the stopper 8a so that it can rotate together with the eccentric member 71, the eccentric plate 23 and the retainer 27.

If a wiper switch (not shown) is switched off to stop the wiping operation, the motor shaft 2 rotates in a reverse direction from the position of FIG. 7b. Also, the motor arm 61 rotates reversely. At that time, the eccentric member 71, the eccentric plate 23 and the second cam 20 are prevented from rotating in relation to the retainer 27 by means of the friction spring 25. When the motor arm 61 rotates reversely by 90°, the groove 19b of the cam 19 aligns with the groove 20b of the cam 20 so that the projection 20a of the cam 20 contacts the other side portion of the groove 19a of the cam 19. Except for this point, the conditions of the mechanism are substantially the same as in FIG. 8e.

When the motor arm 61 further rotates by 90°, that is, totally by 180° (one half rotation) by the motor shaft 2, the cams 19, 20 together rotate to a right angle whereby the stopper 8a engages with the grooves 19b, 20b of the cams 19, 20. Except for this point, no change in condition of the mechanism occurs.

Even if the motor arm 61 rotates further by means of the motor shaft 2, the cams 19, 20 are prevented from rotating by means of the stopper 8a to stop rotation of the eccentric member 71 and the eccentric plate 23. Thus, all of the eccentric member 71, the eccentric plate 23 and the cams 19, 20 rotate relative to the retainer 27 and become spaced from the projections 71a and 27a. As a result, the eccentric member 71 moves into an eccentric position. Also, the friction spring 25 and the eccentric plate 23 rotate relative to each other so that the projection 25a leaves the groove 23b. Except for this point, the conditions are substantially the same as in FIG. 8c.

FIG. 8b shows a condition in which the motor arm 61 rotates by 270° by means of the motor shaft 2. When the motor arm 61 stops after its 360° rotation, as FIG. 8a shows, the eccentric member 71 comes to its most eccentric position, and the eccentric plate 23 rotates by 90° relative to the friction spring 25 as compared with the position shown in FIG. 8b. Except for this point, the conditions in FIGS. 8a and 8b are the same.

When the eccentric member 71 comes to its most eccentric position, the effective length of the connecting rod 15 is longer than the actual length L thereof by the eccentric length l. Since the effective length of the connecting rod 15 becomes (L+l), the blade 18 shifts through the wiper pivot 16 to its received position A of FIG. 1a to be received.

Therefore, if the wiper switch (not shown) is switched off, the stopper 8a rotates by 180° in the same manner as during the wiping operation and then engages the stopper-engaging grooves 19b, 20b as shown in FIGS. 8e to 8c. By the further 180° rotation thereof as shown in FIGS. 8c to 8a, the eccentric metal 71 moves to an eccentric position so that the blade 18 is received in the position A shown of FIG. 1a.

If the wiper switch is switched on the wiping operation starts by rotating the motor shaft 2 to the right and the eccentric member 71 moves from the parked position of FIG. 8a to the wiping positions between B and C in FIG. 1. That is, the eccentric member 71 shifts from the condition of FIG. 8a to its non-eccentric position during its first 180° rotation as shown in FIGS. 8b and 8c. It further shifts through the conditions of FIGS. 8d and 8e to the normal wiping operation positions between B and C in FIG. 1 during the further 180° rotation.

As the small diameter boss portion 19c is formed on the upper surface of the first cam 19 to reduce the friction between the first cam 19 and the second cam 20, the first and second cams 19, 20 can be maintained in position when they shift from the starting position to the normal wiping position, or from the normal wiping position to the parked position.

An electric circuit for controlling the wiping and shifting operations of the blade 18 may be substantially the same as in a conventional circuit so that it is not shown and described herein.

As can be seen from the foregoing, according to the present invention, the rise up operation can be accomplished only by means of several rotating members without any conventional sliding members or portions so that the operations can be ensured and stabilized. Also, as the mechanism can be composed of only rotating members, it can be simplified and compact so that their assembling is easy and the production cost is low. In addition, the blade can operate smoothly in quick response to the rotation of the motor shaft when it starts.

What is claimed is:

1. A wiper device equipped with a rise up mechanism, comprising:
    a motor;
    a wiper blade;
    a wiper pivot connected to the wiper blade;
    a motor arm which rotates in a first direction during starting and wiper operations of the blade and which rotates in a reverse direction during stopping and parking operations of the blade;
    a connecting rod having one end connected to the wiper pivot and having another end connected eccentrically to the motor arm for reciprocating in response to the rotation of the motor arm to swing the wiper pivot;
    a retainer for retaining the connecting rod on the motor arm;
    an eccentric member arranged to be rotatable with or relative to the retainer;
    a friction spring disposed between the eccentric member and the retainer to prevent rotation of the eccentric metal relative to the retainer; and
    a cam mechanism arranged to permit the eccentric member to rotate together with the retainer during the wiping operation and arranged to overcome the action of the friction spring and cause the eccentric member to rotate relative to the retainer just after the starting of the blade or just before the parking and stopping thereof and to change the effective length of the connecting rod to the eccentric degree of the eccentric member.

2. A wiper device as defined in claim 1, wherein the cam mechanism comprises:
    a first cam having a projection-receiving groove and a stopper-engaging groove;
    a second cam having a projection to be received in the projection-receiving groove and a stopper-engaging groove to align with the stopper-engaging groove of the first cam and arranged to rotate in cooperation with the eccentric member; and
    a stopper biased by a spring to engage the stopper-engaging grooves of the first and second cams when the stopper-engaging grooves align with each other.

3. A wiper device of claim 2, further comprising a holder holding therein the first and second cams, the stopper and the spring.

4. A wiper device of claim 3, wherein the holder is fixed to the motor arm.

5. A wiper device of claim 2, further comprising a connecting shaft fixed to the motor arm near one end of the motor arm, a motor shaft of the motor being joined to the motor arm near the other end of the motor arm, the eccentric member and the first and second cams being attached to the connecting shaft.

6. A wiper device of claim 5, further comprising an eccentric plate arranged on the connecting rod between the eccentric member and the second cam.

7. A wiper device of claim 6, further comprising a pin inserted in the holder, the eccentric plate, the eccentric member and the second cam so that they are fixedly assembled together.

8. A wiper device of claim 3 wherein the stopper is pressed against the periphery of the first and second cams by the biasing force of the spring.

9. A wiper device of claim 6, wherein the projection-receiving groove of the first cam is formed in the upper portion thereof, the stopper-engaging portion thereof being formed in the periphery thereof and wherein the projection of the second cam is formed at the lower portion thereof, the stopper-engaging groove of the second cam being formed at the periphery thereof.

10. A wiper device of claims 2 or 9, wherein the first cam has a small diameter boss at the upper portion thereof so as to reduce the friction between the first and second cams.

* * * * *